United States Patent
Spanjers et al.

(10) Patent No.: US 10,836,131 B2
(45) Date of Patent: Nov. 17, 2020

(54) CONVOLUTE TUBE

(71) Applicant: HERAEUS ELECTRO-NITE INTERNATIONAL N.V., Houthalen (BE)

(72) Inventors: Maarten Spanjers, Bergeijk (NL); Wouter Siemons, Kinrooi (BE)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 0 days.

(21) Appl. No.: 16/314,520

(22) PCT Filed: Oct. 25, 2017

(86) PCT No.: PCT/EP2017/077291
§ 371 (c)(1),
(2) Date: Dec. 31, 2018

(87) PCT Pub. No.: WO2018/091243
PCT Pub. Date: May 24, 2018

(65) Prior Publication Data
US 2019/0263082 A1    Aug. 29, 2019

(30) Foreign Application Priority Data
Nov. 18, 2016   (EP) .................................... 16199483

(51) Int. Cl.
*B31C 1/00* (2006.01)
*B32B 1/08* (2006.01)
*F16L 11/00* (2006.01)

(52) U.S. Cl.
CPC .................. *B31C 1/00* (2013.01); *B32B 1/08* (2013.01); *F16L 11/00* (2013.01)

(58) Field of Classification Search
CPC .................................. B31C 1/00; F16L 11/00
(Continued)

(56) References Cited

U.S. PATENT DOCUMENTS 2,225,026 A * 12/1940 Welsh ....................... B31C 3/00
156/195
3,770,556 A    11/1973 Evans et al.
(Continued)

FOREIGN PATENT DOCUMENTS

| CN | 2435606 Y | 6/2001 |
| CN | 104087712 A | 10/2014 |

(Continued)

OTHER PUBLICATIONS

International Search Report issued in PCT/EP2017/077291 dated Jan. 16, 2018.

*Primary Examiner* — Patrick F Brinson
(74) *Attorney, Agent, or Firm* — Blank Rome LLP

(57) ABSTRACT

A convolutely wound tube (1) is formed of a composite sheet including a first sheet (6) and a second sheet (5). The convolutely wound tube includes a first segment (66) formed of a plurality of convolute windings (2) of the first sheet, a second segment (70) formed of directly adhered and overlapping portions of the first sheet and the second sheet, and a third segment (68) formed of the second sheet wrapped about and overlying the first sheet. The second segment is an underwrap portion positioned between a layer of the first sheet and a layer of the second sheet.

19 Claims, 5 Drawing Sheets

(58) Field of Classification Search
USPC .............. 138/129, 144, 130; 428/34.1, 34.2;
156/195, 190, 425–429; 242/610.1
See application file for complete search history.

(56) References Cited

U.S. PATENT DOCUMENTS

| | | | | |
|---|---|---|---|---|
| 5,393,582 | A * | 2/1995 | Wang | B31C 3/00 |
| | | | | 428/34.2 |
| 5,472,154 | A * | 12/1995 | Qiu | B31C 3/00 |
| | | | | 138/129 |
| 5,505,395 | A * | 4/1996 | Qiu | B31C 3/00 |
| | | | | 138/140 |
| 7,712,487 | B2 * | 5/2010 | van de Camp | B31C 3/00 |
| | | | | 138/129 |
| 8,084,108 | B2 * | 12/2011 | Niu | B31C 3/00 |
| | | | | 138/129 |
| 2010/0007067 | A1 | 1/2010 | Vermeulen | |

FOREIGN PATENT DOCUMENTS

| | | |
|---|---|---|
| FR | 1087723 A | 2/1955 |
| JP | 34-10398 | 11/1959 |
| JP | S5393420 A | 8/1978 |
| JP | S60203364 A | 10/1985 |
| JP | S60206634 A | 10/1985 |
| JP | H0979909 A | 3/1997 |
| WO | WO-2009152293 A2 | 12/2009 |

* cited by examiner

CONVOLUTE TUBE

CROSS-REFERENCE TO RELATED APPLICATIONS

This application is a national stage of International Patent Application No. PCT/EP2017/077231, filed Oct. 25, 2017, which claims the benefit of Europe Patent Application No. 16199483.5, filed Nov. 18, 2016, each of which are hereby incorporated by reference in their entirety.

TECHNICAL FIELD

The invention relates to a convolute tube formed of a plurality of convolutely wound, adhesively secured sheet materials and a method for producing a convolute tube.

BACKGROUND

The conventional configuration of convolute tubes, sometimes called parallel tubes, and the conventional process of making such tubes by use of winding machines are known, for example, from U.S. Pat. Nos. 3,073,218, 3,190,195, 3,585,908 and 3,869,325. Conventional winding machines normally include mechanisms for initially feeding a continuous single sheet of paper or cardboard from a roll or coil of paperboard, preparing the edges of the paper sheet by skiving, coating a surface of the paper sheet and the skived edges with glue, cutting the paper sheet to a predetermined length which corresponds to the length of the wound paper tube to be produced (the paper width is determined by the width of the coil), advancing the leading edge of the paper sheet into a slotted mandrel onto which it is to be wound, and stripping the wound paper tube from the mandrel after completion of the winding by moving a tube stripper along the mandrel and returning the tube stripper to its initial position, all in a timed sequence.

Conventional convolute winding of a sheet of paper into a paper tube of a desired dimension will be limited by the winding machine, and more specifically the winding mandrel. Specifically, the starting paper sheet material is typically on a coil and although the entire length of the paper sheet material on the coil is generally substantial, a length of the paper sheet material that is cut from this coil for winding into a paper tube is limited by the length of the winding machine. In practice, the terminology of a paper sheet material "cut to length" equates to the length of the tube formed from this sheet material. The leading edge and the trailing edge of the cut paper sheet material are opposing edges that correspond to the width of the coil. That is, when a paper sheet material is cut from the coil, the leading and trailing edges are the edges which are perpendicular to the cut edges. The leading edge is the edge of the cut paper sheet material that is fed into the slot of the winding mandrel.

A conventional winding mandrel is an elongated tube attached to a gear mechanism by its end adjacent to the paper feeding rollers. The opposite end of the winding mandrel is unattached, but supported to allow it to spin with the paper sheet material to be wound without bending. The winding mandrel has an outer diameter which essentially corresponds to the inner diameter of the tube to be formed. Each layer of the paper sheet material which is wound on top of the winding mandrel, and then on top of the previous wrap of paper sheet material, builds upon the wall thickness of the paper tube which is being formed. The final outer diameter of the formed convolute paper tube is a function of the thickness of the paper sheet material used and the amount of convolutions that can be accomplished based on the width of the paper sheet material from the leading edge to the trailing edge.

After the winding operation, the free end of the cut elongated paper sheet material forms a trailing edge, which corresponds to an outer edge, at the tube surface that must be securely adhered to the underlying layer (see FIG. 2). FIG. 2 shows a state of the art convolute paper tube 100 having a longitudinal center axis 109. The convolute tube 100 is made entirely from a single primary sheet 106 having a leading edge 103 located at an inner surface of the tube 100 and a trailing edge 104 located at an outer surface of the tube 100. The winding including the trailing edge 104 must be adhered to the underlying layer of the primary sheet 106. Otherwise, if the trailing edge 104 is not secured, the tube 100 will unravel when it is stripped off of the winding mandrel. After the trailing edge 104 is fixed or secured and after a few free turns which are needed to hold the trailing edge 104 of the primary sheet 106 so that it has time to bond to the underlying layer without unwrapping, the convolute tube 100 is pushed off of the winding mandrel in a direction opposite to the fixed or secured edge 104.

Various prior art documents, such as U.S. Pat. Nos. 3,869,325 and 3,081,213 have suggested different mechanisms for improving the fixation of the trailing edge to the underlying layer of primary (e.g., paper) sheet material of the wound tube, such as reducing the stiffness of the paper sheet material, increased wetting of the paper sheet material, and applying a fast-setting thermoplastic resin or glue on the windings and the trailing edge. However, these solutions lead to lower material strength and/or high production expenditures.

The solution disclosed in U.S. Pat. Nos. 2,353,994, 2,726,489 and 4,708,708 is to reduce the thickness of the trailing edge of the paper sheet material, as shown in FIG. 3. Specifically, FIG. 3 shows a state of the art convolute paper tube 200 having a longitudinal center axis 209. The convolute tube 200 is made entirely from a single primary sheet 206 having a leading edge 203 located at an inner surface of the tube 200 and a trailing edge 204 located at an outer surface of the tube 200. The trailing edge 204 is a skived edge. Skiving of the trailing edge 204 softens the paper edge to aid in the prevention of unwinding prior to stripping the tube 200 off the winding mandrel without applying special adhesion techniques.

This has become common practice in convolute tube winding today. Specifically, prior to the application of an adhesive (i.e., glue), an abrasive wheel or similar means for skiving, sanding or deckling removes material from the trailing edge of the primary sheet material at an angle that reduces the sheet material thickness to a knife-like edge.

The advantage of a skived edge is that the edge has a reduced thickness and is thus less stiff, such that it will absorb glue readily and, in turn, has increased pliability, which provides for a smooth transition at the primary sheet trailing edge. As a result, tube roundness is improved.

However, this solution also suffers from several drawbacks. The use of abrasives results in a roughened surface which appears on the exterior of the tube and is prone to tearing along its longitudinal seam. A more significant drawback is that producing the beveled edge by skiving requires the removal of paper sheet material, which results in the generation of large quantities of paper dust which cannot be recycled and must thus be sent to landfills—an undesirable necessity from an environmental standpoint. Removal of the paper dust also increases the overall production expenditures, in addition to the costs related to the abrasive machines. Moreover, paper dust is both a fire and explosion hazard in the workplace and requires handling systems for containment, storage and transportation of the dust, which again increase the production costs.

One alternative is to manufacture the convolute tube entirely from a thinner paper sheet material, such that the trailing edge is already reduced. However, the width of the paper sheet material fed into the paper tube winding mandrel and the thickness of the paper sheet material determines the finished convolute tube wall thickness. This alternative would therefore require the use of a much wider paper sheet material and more adhesive to be applied to a greater surface area of the paper sheet material to achieve a finished convolute tube of a specific desired wall thickness. Also, in most cases, this alternative would not be possible on a standard production machine which is configured and dimensioned to accommodate standard width paper sheet materials. Instead, this alternative would require that all mechanical portions of the winding mandrel be increased to accommodate the wider sheet width. It is thus economically beneficial to use a thicker, rather than thinner paper sheet material, but increasingly more difficult to flatly adhere the trailing edge to the underlying layer of paper sheet material as the thickness of the paper sheet material increases.

Accordingly, it would be beneficial to provide an improved convolute tube and method for producing such a tube, which is capable of high speed manufacture with reduced production expenditures and without creating hazardous dust waste during production.

SUMMARY

The invention relates to a convolute tube made of a convolutely wound, adhesively secured composite sheet material comprising a primary convolute sheet material of a first thickness and a fixation sheet material of a second thickness.

The invention relates to a convolute tube made of a convolutely wound, adhesively secured composite sheet material comprising a primary convolute sheet material of a first thickness and a fixation sheet material of a second thickness. The lengths of both primary and fixation sheets may be equal or cut to equal the length of the resulting wound tube. A portion of the fixation sheet material is adhered in an overlapping manner to an end portion of the primary sheet material along the entire length of the primary sheet material, thereby forming a lap seam or lap joint. Both sheets thus attached form a width extended composite sheet. The width of the composite sheet essentially has three distinct portions, as follows: a first portion consisting of just the primary sheet material of a single thickness and a first width, a second portion consisting of the primary sheet material overlaid by the fixation sheet material and having a thickness which is the sum of the thicknesses of the primary and fixation sheet materials and a second width (i.e., the lap seam portion), and a third portion consisting of the fixation sheet material of a single thickness and a third width.

When winding the composite sheet to form a convolute tube, the portion of the fixation sheet material in the lap seam portion of the composite sheet is captured between layers of the primary sheet material. The portion of the fixation sheet in excess of the lap seam (i.e., the third portion of the composite sheet) continues to be wound until it completes one full circumference of the nearly formed convolute tube and then continues for a portion of the circumference of the nearly formed convolute tube adhering to itself.

In summary, the following embodiments are proposed as particularly preferred in the scope of the invention:

Embodiment 1

A convolutely wound tube formed of a composite sheet including a first sheet and a second sheet, the convolutely wound tube comprising: a first segment formed of a plurality of convolute windings of the first sheet; a second segment formed of directly adhered and overlapping portions of the first sheet and the second sheet; a third segment formed of the second sheet wrapped about and overlying the first sheet, the second segment being an underwrap portion positioned between a layer of the first sheet and a layer of the second sheet.

Embodiment 2

Convolutely wound tube according to the preceding embodiment, characterized in that a width ($W_{22}$) of the second segment satisfies formula (1) and a width ($W_{23}$) of the second sheet satisfies formula (2):

$$W_{22} \geq R*8 \text{ mm} \tag{1}$$

$$W_{23} \geq W_{22}+(\pi*OD_6)+(R*20 \text{ mm}) \tag{2}$$

R is a ratio of a thickness of the first sheet to a thickness of the second sheet. $OD_6$ is a theoretical outer diameter of a convolute tube if formed only of the first sheet without the second sheet.

Embodiment 3

Convolutely wound tube according to the preceding embodiment, characterized in that the thickness of the second sheet is smaller than the thickness of the first sheet.

Embodiment 4

Convolutely wound tube according to the preceding embodiment, characterized in that the ratio R is between 2 and 5.

Embodiment 5

Convolutely wound tube according to any of the preceding embodiments, characterized in that the third segment is formed of at least one convolute winding of the second sheet, which overlies a layer of the first sheet and the second segment.

Embodiment 6

Convolutely wound tube according to the preceding embodiment, characterized in that the third segment further comprises a portion of the second sheet overlying the at least one convolute winding of the second sheet.

Embodiment 7

Convolutely wound tube according to any of the preceding embodiments, characterized in that the first sheet has a first edge defining an inner edge of the tube and an opposing second edge.

Embodiment 8

Convolutely wound tube according to any of the preceding embodiments, characterized in that the second sheet has a first edge and an opposing second edge, the second edge of the second sheet defining an outer seam of the convolutely wound tube, the underwrap portion including the first edge of the second sheet and the third segment including the second edge of the second sheet.

Embodiment 9

Convolutely wound tube according to any of the preceding embodiments, characterized in that the underwrap portion is an adhesively secured lap seam joining the first and second sheets.

Embodiment 10

Convolutely wound tube according to any of the preceding embodiments, characterized in that the first sheet is formed of a paper material.

Embodiment 11

Convolutely wound tube according to any of the preceding embodiments, characterized in that the second sheet is formed of a paper material.

Embodiment 12

A convolutely wound tube formed of a composite sheet including a first sheet, a second sheet and a third sheet, the convolutely wound tube comprising: a first segment formed of a plurality of convolute windings of the first sheet; a second segment formed of directly adhered and overlapping portions of the first sheet and the second sheet; a third segment formed the second sheet wrapped about and overlying the first sheet, the second segment being an underwrap portion positioned between a layer of the first sheet and a layer of the second sheet; and a fourth segment formed of at least one convolute winding of the third sheet which is secured between an underlying convolute winding of the first sheet and an overlying convolute winding of the first sheet.

Embodiment 13

Convolutely wound tube according to the preceding embodiment, characterized in that a width ($W_{22}$) of the second segment satisfies formula (1) and a width ($W_{23}$) of the second sheet satisfies formula (2):

$$W_{22} \geq R*8 \text{ mm} \quad (1)$$

$$W_{23} \geq W_{22} + (\pi*OD_6) + (R*20 \text{ mm}) \quad (2).$$

R is a ratio of a thickness of the first sheet to a thickness of the second sheet. $OD_6$ is a theoretical outer diameter of a convolute tube if formed only of the first sheet without the second sheet.

Embodiment 14

Convolutely wound tube according to the preceding embodiment, characterized in that the ratio R is between 2 and 5.

Embodiment 15

Convolutely wound tube according to any of the two preceding embodiments, characterized in that a thickness of the third sheet is smaller than the thickness of the second sheet.

Embodiment 16

Convolutely wound tube according to any of the four preceding embodiments, characterized in that the first sheet is formed of a paperboard material.

Embodiment 17

Convolutely wound tube according to the preceding embodiment, characterized in that the second sheet is formed of a paper material, the thickness of the second sheet being smaller than the thickness of the first sheet.

Embodiment 18

Convolutely wound tube according to any of the six preceding embodiments, characterized in that the third sheet is made of a moisture resistant material.

Embodiment 19

Convolutely wound tube according to any of the seven preceding embodiments, characterized in that a reminder portion the third sheet overlaps the at least one convolute winding of the third sheet by a distance of at least 90° of the circumference of the at least one convolute winding of the third sheet.

BRIEF DESCRIPTION OF DRAWINGS

The foregoing summary, as well as the following detailed description of preferred embodiments of the invention, will be better understood when read in conjunction with the appended drawings. For the purpose of illustration, there are shown in the drawings embodiments which are preferred. It should be understood, however, that the device and method are not limited to the precise arrangements and instrumentalities shown. In the drawings.

DETAILED DESCRIPTION

The invention relates to a convolutely wound tube and method for producing the convolute tube. More particularly, the invention relates to a convolute paper tube formed of a composite sheet material comprising a primary paper sheet material and a fixation sheet material adhesively secured thereto. In one embodiment, the convolute paper tube may be used as a carrier tube for a thermocouple device, and more particularly for a thermocouple device suitable for use in molten metal processing, and the like. It will be understood by those skilled in the art that the convolute tube may be utilized for various other purposes than as a carrier tube for a thermocouple device.

Figure 4:
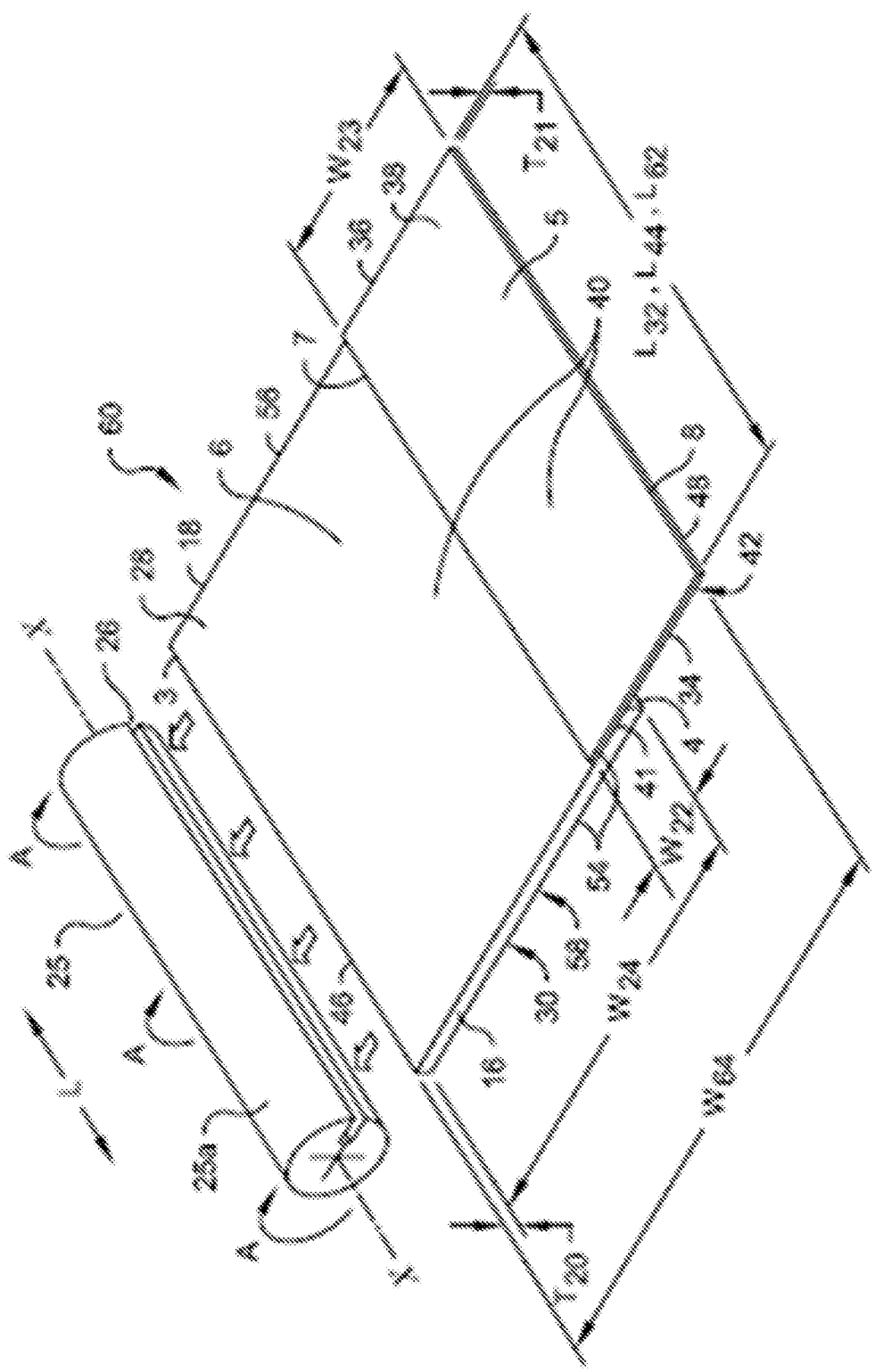
FIG. 4 shows the initial positioning of a composite sheet comprising a first sheet and a second sheet relative to a winding mandrel, before the composite sheet is inserted into a slot of the winding mandrel for a winding operation, in accordance with one embodiment of the invention.

Referring to FIG. 4, there is shown a composite sheet 60 used to form a convolute tube 1 (shown in FIG. 1) in accordance with an embodiment of the invention. FIG. 4 depicts the composite sheet 60 before it has been subjected to a winding operation to form the convolute tube 1. The composite sheet 60 comprises a first sheet 6 and a second sheet 5. The first sheet 6 is a primary sheet. The second sheet 5 is a fixation sheet.

The first sheet 6 has a first edge 3 and an opposing second edge 4 which extend parallel to each other. For purposes of the production method, and more particularly for purposes of the progression of the composite sheet 60 through the winding mandrel 25 for formation of the convolute tube 1, the first edge 3 is a leading edge and the second edge 4 is a trailing edge. The first sheet 6 further has a third edge 16 and an opposing fourth edge 18, which extend parallel to each other and perpendicular to the leading and trailing edges 3, 4. The first sheet 6 also has a first surface 28, which corresponds to an upper surface, and an opposing second surface 30, which corresponds to a lower surface.

A thickness 20 ($T_{20}$) of the first sheet 6 is defined as the distance between the first and second surfaces 28, 30. A length L32 of the first sheet 6 is defined by the distance between the third and fourth edges 16, 18 which extend perpendicular to the leading and trailing edges 3, 4. The length L32 of the first sheet 6 may be of any dimension and is only limited by the physical size of the winding mandrel 25, as well as by the desired length of the final convolute tube 1 to be produced.

A width $W_{24}$ of the first sheet 6 is defined as the distance between the leading and trailing edges 3, 4. In the context of the invention and in the field of convolute tubes in general, the term "width" refers merely to a numerical distance between two points on a geometric body, conventionally taken as being perpendicular to the axis X of winding of the winding mandrel 25. The reference to "width" in the context of the invention therefore refers only to theoretical considerations. Nevertheless, in terms of the invention, the width $W_{24}$ of the first sheet 6 and the width $W_{23}$ of the second sheet 5 (which is discussed in greater detail hereinafter) are measurable values, particularly before the two sheets 5, 6 are joined and subjected to a winding operation to form the convolute tube 1.

The second sheet 5 has a first edge 7 and an opposing second edge 8 which extend parallel to each other. In the context of the progression of the composite sheet 60 through the winding mandrel 25 for formation of the convolute tube 1, the first edge 7 is a leading edge and the second edge 8 is a trailing edge. The trailing edge 8 is preferably an unskived edge. The second sheet 5 further has a third edge 34 and an opposing fourth edge 36 which extend parallel to each other and perpendicular to the leading and trailing edges 7, 8. The second sheet 5 also has a first surface 38, which corresponds to an upper surface, and an opposing second surface 42, which corresponds to a lower surface.

A thickness $T_{21}$ of the second sheet 5 is defined as the distance between the first and second surfaces 38, 42. A length L44 of the second sheet 5 is defined by the distance between the third and fourth edges 34, 36 which extend perpendicular to the leading and trailing edges 7, 8. The length L44 of the second sheet 5 may be of any dimension and is only limited by the physical size of the winding mandrel 25, as well as by the desired length of the final convolute tube 1 to be produced. Preferably, however, the length L44 of the second sheet 5 is the same as the length L32 of the first sheet 6. The width $W_{23}$ of the second sheet 5 is defined as the distance between the leading and trailing edges 7, 8. The second sheet 5 may or may not include printed information or other markings.

The minimum dimensions of the second sheet 5 are selected and determined based on characteristics of the first sheet 6 in order to ensure that the trailing edge 4 of the first sheet 6 will be secured to the underlying layer and will not unwind during manufacture of the convolute tube 1. Thus, the dimensions of the second sheet 5 are not limited to any particular values, but rather vary based upon the dimensions of the first sheet 6.

Specifically, the thickness $T_{21}$ of the second sheet 5 is preferably selected such that the second sheet 5 has sufficient strength to be handled in an industrial manner, thereby avoiding tearing of the second sheet 5 during the rolling or winding process to form the convolute tube 1, but is still thin enough to be used to create a convolute tube 1 of the invention—that is, a sheet that does not require skiving for formation of a convolute tube. When the first sheet 6 is of a relatively large thickness $T_{20}$, its stiffness increases. The thickness $T_{21}$ of the second sheet 5 is preferably incrementally increased in a direct relationship with the thickness $T_{20}$ of the first sheet 6. Preferably, the thickness $T_{21}$ of the second sheet 5 ranges from 0.1 mm to 0.4 mm, and more preferably 0.2 mm to 0.3 mm, and most preferably 0.2 mm. However, it will be understood that the second sheet 5 may have any thickness suitable for convolute winding of tubes.

Starting from the given thickness $T_{20}$ of the first sheet 6 to produce the desired convolute tube 1 and the selected thickness $T_{21}$ of the second sheet 5, the ratio R of the thickness $T_{20}$ of the first sheet 6 to the thickness $T_{21}$ of the second sheet 5 is as follows:

$$R = T_{20}/T_{21}.$$

In one embodiment, the thickness $T_{21}$ of the second sheet 5 is smaller than the thickness $T_{20}$ of the first sheet 6, such that the second sheet 5 is more flexible than the first sheet 6. Preferably, the ratio R is between 2 and 5.

To form the composite sheet 60, the first sheet 6 and the second sheet 5 are assembled together. As shown in FIG. 4, in the composite sheet 60, a portion of the second sheet 5 is laid over a portion of the first sheet 6, such that the leading edge 7 of the second sheet 5 overlaps the trailing edge 4 of the first sheet by a minimum calculated width $W_{22}$, thus forming a lap seam 41 (also called a lap joint). When the thickness $T_{20}$ of the first sheet 6 increases, its stiffness also typically increases, and therefore a greater width of the second sheet 5 is required to form the lap seam 41, as calculated, due to a change in the ratio R. More particularly, a portion of the second sheet 5 including the leading edge 7 is arranged in an overlapping manner along the entire length L32 of the first sheet 6 forming the lap seam 41. The lower surface 42 of the second sheet 5 is in contact with the upper surface 28 of the first sheet 6 for the entire length of the lap seam 41. During the process of manufacturing of the tube 1, the entire upper surfaces 28 and 38 of the first and second sheets 6, 5, respectively, are coated with an adhesive. The second sheet 5 is layered upon the first sheet 6, resulting in the adhesive being present in the area of the lap seam 41 to form an adhesively secured lap seam 41. Preferably, the same adhesive is applied to the upper surfaces 28 and 38 of the first and second sheets 6, 5, respectively. The adhesive may be polyvinyl acetate, sodium silicate, starch, or any adhesive conventionally known to be suitable for use in forming convolute tubes.

The width $W_{22}$ of the lap seam 41 achieved by the placement of the second sheet 5 upon the first sheet 6 is determined based on the ratio R, discussed above. Specifically, the minimum distance $W_{22}$ of the overlap between the first and second sheets 6, 5 corresponds to the minimum calculated width $W_{22}$ of the lap seam 41. The width $W_{22}$ of the lap seam 41 is a function of the ratio R between the thickness $T_{20}$ of the first sheet 6 and the thickness $T_{21}$ of the second sheet 5. More particularly, the minimum width $W_{22}$ of the lap seam 41, which corresponds to an underwrap portion 70 of the convolute tube 1 as will be described in greater detail herein, satisfies the following formula (1):

$$W_{22} \geq R*8 \text{ mm} \qquad (1),$$

where $R=T_{20}/T_{21}$ and where 8 mm is an equation constant. The width $W_{22}$ of the lap seam 41 corresponds to the portion of the second sheet 5 that will be wrapped under the end (i.e., trailing) portion of first sheet 6 during the winding process to form the convolute tube 1, as discussed below.

In the assembled composite sheet 60, the third and fourth edges 16, 18 of the first sheet 6 are flush with the third and fourth edges 34, 36 of the second sheet 5. The composite sheet 60 further has a first edge 46, which corresponds to the leading edge 3 of the first sheet 6, and an opposing second edge 48, which corresponds to the trailing edge 8 of the second sheet 5. The first and second edges 46, 48 extend parallel to each other. In the context of the progression of the composite sheet 60 through the winding mandrel 25 for formation of the convolute tube 1, the first edge 46 is a leading edge and the second edge 48 is a trailing edge. The composite sheet 60 further has a third edge 54 (comprising the third edges 16 and 34 of the first and second sheets 6, 5, respectively) and an opposing fourth edge 56 (comprising the fourth edges 18 and 36 of the first and second sheets 6, 5, respectively), which extend parallel to each other and perpendicular to the leading and trailing edges 46, 48.

The composite sheet 60 also has a first surface 40, which corresponds to an upper surface, and an opposing second surface 58, which corresponds to a lower surface. The upper surface 40 of the composite sheet 60 is preferably comprised of the entire surface area of the upper surface 38 of the second sheet 5 and the entire surface area of the upper surface 28 of the first sheet 6 less the portion of the first sheet 6 which is covered by the lap seam 41. The lower surface 58 of the composite sheet 60 is preferably comprised of the entire surface area of the lower surface 30 of the first sheet 6 and the entire surface area of the lower surface 42 of the second sheet 5 less the portion of the second sheet 5 which is covered by the lap seam 41.

A length L62 of the composite sheet 60 is defined by the distance between the third and fourth edges 54, 56 which extend perpendicular to the leading and trailing edges 46, 48. For formation of the convolute tube 1, the composite sheet 60 is preferably formed at or cut to length L62 that corresponds to the desired length of the final convolute tube 1 to be produced, limited only by physical size of the winding mandrel 25 to be used to form the convolute tube 1. By providing a composite sheet 60 which is cut to length, rather than providing separate first and second sheets 6, 5 which are first cut to length and then assembled, more precise and uniform geometry of the composite sheet 60 can be achieved and, thus a more reliable rolling process in the winding mandrel 25 can be obtained. A width $W_{64}$ of the composite sheet 60 is defined as the distance between the leading and trailing edges 46, 48.

Figure 1:
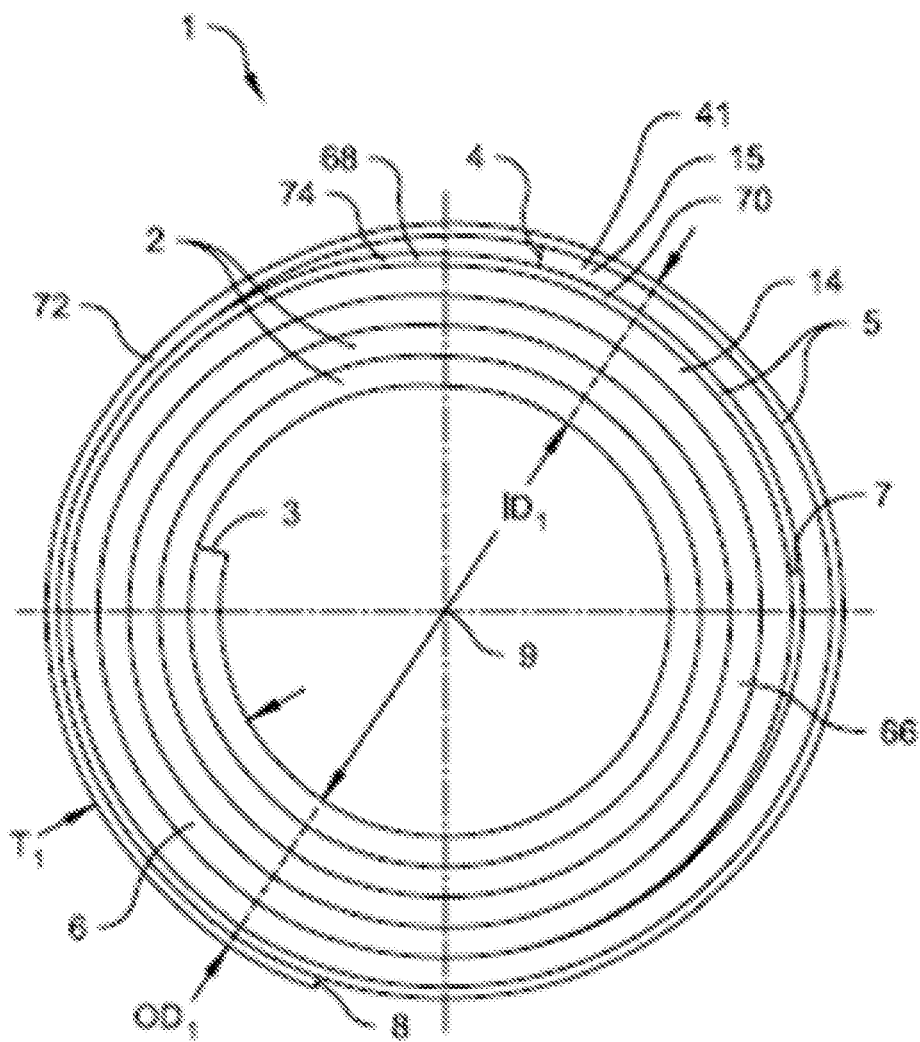
FIG. 1 is a top plan view of a convolute tube formed from a first sheet and a second sheet which have been wound together in accordance with one embodiment of the invention.
Figure 2:
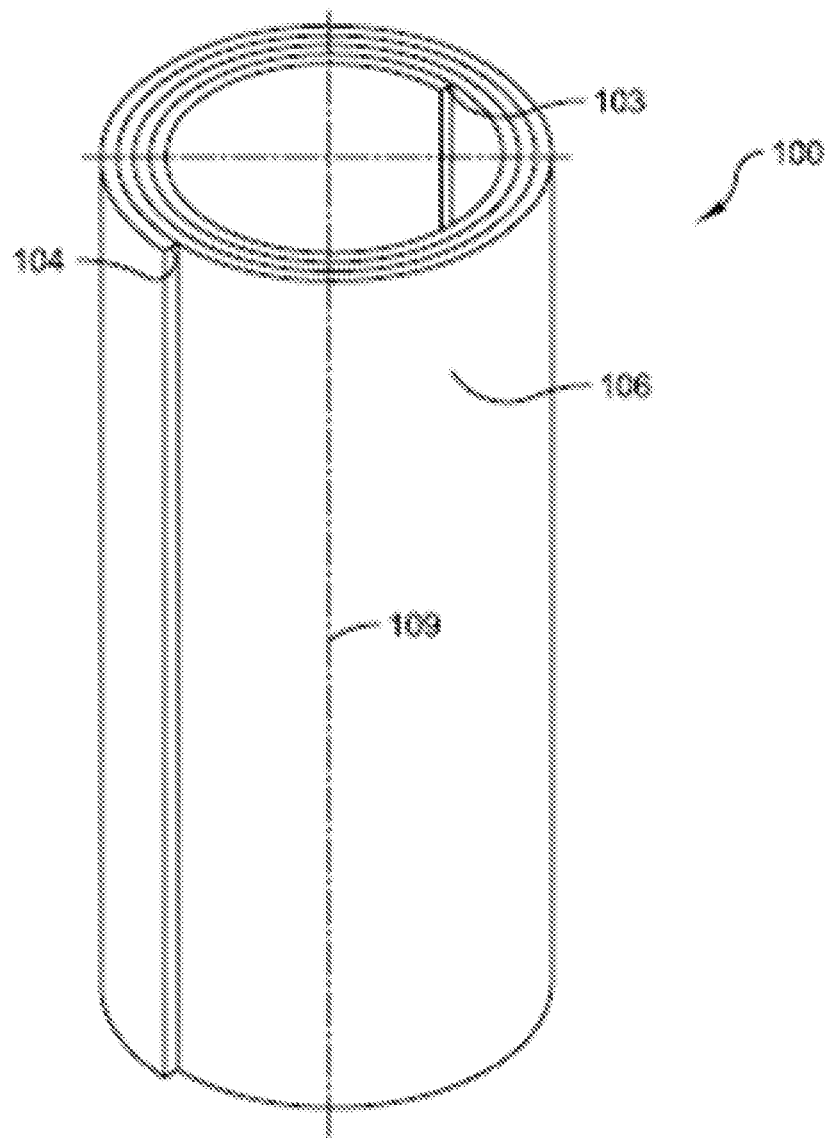
FIG. 2 is a side perspective view of a prior art convolute tube produced without a skived trailing edge.

The thus completed or otherwise assembled composite sheet 60, shown in FIG. 4, is then formed into the convolutely wound tube 1 shown in FIG. 1. Initially, the entire upper surface 40 of the composite sheet 60 is preferably coated with an adhesive to secure adjacent layers to each other in the finished convolute tube 1. Preferably, the same adhesive which is applied to the upper surface 40 of the composite sheet 60 is also used to create the lap seam 41. The adhesive may be polyvinyl acetate, sodium silicate, starch, or any adhesive conventionally known to be suitable for use in forming convolute tubes.

Then, the leading edge 46 of the adhesive-coated composite sheet 60, and more particularly the leading edge 3 of the first sheet 6 of the composite sheet 60, is fed into a slot 26 of the winding mandrel 25 (see FIG. 4). The winding mandrel 25 is then wound or rotated in a first direction A about the longitudinal axis X. Preferably, the first direction A is a clockwise direction. That is, in order to form the convolute tube 1, the first sheet 6 and the second sheet 5 are convolutely wound about a common longitudinal axis (e.g., the longitudinal axis X) and in the same direction A of rotation (e.g., in the clockwise direction). As the composite sheet 60 is wound around the mandrel 25, each wound layer is referred to as a winding (see FIG. 1). In the context of the invention, the term "winding" or "convolute winding" essentially means one circular layer of a sheet material laid over the mandrel or another sheet material of an angular range of more than 350 degrees, preferably just more than 360 degrees. That is, one convolute winding equates to one wrap of a sheet material around the tube 1, such that the starting point meets the finishing point.

During rotation of the mandrel 25 in the clockwise direction A about the longitudinal axis X, the leading edge 46 of the composite sheet 60 remains secured within the slot 26, such that the composite sheet 60 is caused to wind and wrap around the exterior cylindrical surface 25a of the mandrel 25. More particularly, as the mandrel 25 rotates in the clockwise direction, the first sheet 6 is first wound about the exterior cylindrical surface 25a of the mandrel 25 and the second sheet 5 is subsequently wound on top of a winding 2 of the first sheet 6, without requiring stopping or slowing of the winding mandrel 25. The term "winding 2" is used here merely as an indication of an underlying winding, and not any specific individual winding. The rotational movement of the mandrel 25 is continued until the entire width $W_{64}$ of the composite sheet 60 has been wound around the mandrel 25. More particularly, the rotational movement of the mandrel 25 continues at least until the trailing edge 48 of the composite sheet 60, and more particularly the trailing edge 8 of the second sheet 5, has been secured to the underlying winding 74. This leads to a high production efficiency.

As the mandrel 25 is rotated, portions of the upper surface 40 of the composite sheet 60 are successively brought into contact with portions of the lower surface 58 of the composite sheet 60, such that the adhesive coated on the upper surface 40 bonds the successive portions of the upper and lower surfaces 40, 58 together after the adhesive has achieved a degree of tackiness. As such, the adhesive coated on the upper surface 40 of the composite sheet 60 serves to secure the bottom surface of an overlying winding 2 to the top surface of an underlying winding 2.

Referring to FIG. 1, the resulting convolute tube 1 has a longitudinal center axis 9. The resulting convolute tube 1 also comprises windings 2 formed of the first sheet 6 and windings 74 formed of the second sheet 5. More particularly, the convolute tube 1 comprises a first segment 66, a second segment 70 and a third segment 68. The first segment 66 comprises a plurality of convolute windings 2 of the first sheet 6. More particularly, the first segment 66 preferably includes at least two windings 2 of the first sheet 6. The windings 2 of the first sheet 6 are adhesively secured to each other by the adhesive coated on the upper surface 40 of the composite sheet 60.

In the convolutely wound tube 1, the leading edge 3 of the convolutely wound first sheet 6 (corresponding to the leading edge 46 of the composite sheet 60) forms an inner edge of the tube 1 and the trailing edge 4 of the convolutely wound first sheet 6 is secured to and on an underlying winding 2 of the first sheet 6.

Figure 3:
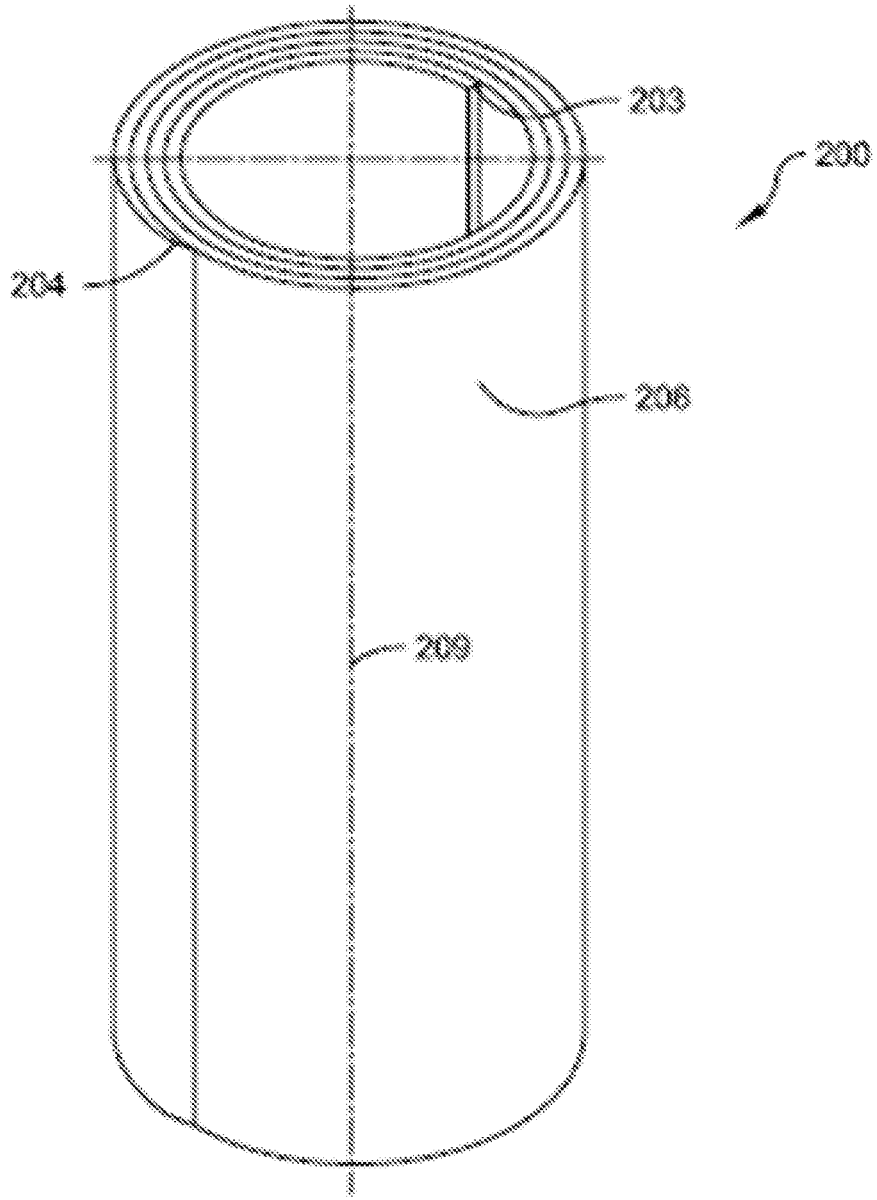
FIG. 3 is a side perspective view of a prior art convolute tube produced with a skived trailing edge.

As shown in FIG. 1, the leading edge 3 has a rectangular cross-sectional shape or profile that forms a stepped contour with the surface of an adjacent, and more particularly an overlying, winding 2. Similarly, the trailing edge 4 of the first sheet 6 has a rectangular cross-sectional shape or profile that forms a stepped contour with the surface of an adjacent, and more particularly an underlying or overlying, winding 74 of the second sheet 5. Such a profile is in contrast to state of the art convolute tubes (e.g., such as the tube shown in FIG. 3) which have a skived trailing edge with an elongated triangular shape that tapers to a knife edge relative to an adjacent winding.

In the context of the process of forming the convolutely wound tube 1 by winding the composite sheet 60 by a winding mandrel 25, after the first sheet 6 has been wound into the plurality of windings 2 forming the first segment 66, the mandrel 25 continues to rotate such that the second sheet 5 is wrapped about itself (to form the third segment 68 as discussed in further detail hereinafter) and a portion of the second sheet 5 in the lap seam 41 (i.e., from the leading edge 7 of the second sheet 5 to a position corresponding to the trailing edge 4 of the first sheet 6) becomes positioned between two layers 14, 15 (also called wraps) of the first sheet 6. The second segment 70 of the convolute tube 1 is thus formed by the overlapping portions of the first sheet 6 and the second sheet 5 in the area of the lap seam 41. More particularly, the second segment 70 of the convolute tube 1 is formed of the directly adhered and overlapping portions of the first sheet 6 and the second sheet 5. The second segment 70 is an underwrap portion of the convolutely wound tube 1 positioned between a layer of the first sheet 6 and a layer of the second sheet 5. More particularly, the underwrap portion 70 is positioned both above a first wrap 14 of the first sheet 6 and under a convolute winding 74 of the second sheet 5 for a distance equivalent to the width $W_{22}$ of the lap seam 41.

The underwrap portion 70 includes and extends between the leading edge 7 of the second sheet 5 and the trailing edge 4 of the first sheet 6. More particularly, the underwrap portion 70 is an adhesively secured lap seam 41 joining the first and second sheets 6, 5.

As the mandrel 25 continues to rotate, a portion of the second sheet 5 proceeds to wrap upon an underlying layer of the first sheet 6 for a distance nearly equivalent to one circumference (i.e., one convolution) that would have been achieved by the first sheet 6 alone, and upon the underwrap portion 70, thereby forming the third segment 68. The third segment 68 is thus formed of the second sheet 5 wrapped about and overlaying the first sheet 6. The third segment 68 comprises at least one winding 74 formed from the second sheet 5 which is wrapped about and overlies a layer of the first sheet 6. More particularly, the third segment 68 preferably includes at least one winding 74 of the second sheet 5 around an end portion of the first sheet 6 up to the trailing edge 4 of the first sheet 6 (i.e. the second sheet 5 is wound around the mandrel 25 by more than 360 degrees). It will be understood that the third segment 68 may include more than one winding 74 of the second sheet 5. Preferably, the at least one winding 74 of the second sheet is adhesively secured to the underlying layer of the first sheet 6 by the adhesive coated on the upper surface 40 of the composite sheet 60.

The third segment 68 preferably further includes an overwrap portion 72. Specifically, as the mandrel 25 continues its winding operation, a portion, and more particularly an end portion, of the second sheet 5 wraps upon itself to form an overwrap portion 72 of the third segment 68 of the convolutely wound tube 1. Specifically, the end portion of the second sheet 5 extending from a position corresponding to the trailing edge 4 of the first sheet 6 to the trailing edge 8 of the second sheet 5 wraps upon and overlies the at least one convolute winding 74 of the third segment 68. Thus, the overwrap portion 72 includes the trailing edge 8 of the second sheet 5. The overwrap portion 72 is adhesively secured to the underlying convolute winding 74 of the second sheet 5 by the adhesive coated on the upper surface 40 of the composite sheet 60 while the mandrel continues to rotate another turn, or two, after all of the composite sheet 60 has been rolled.

In terms of a clockwise winding movement of the winding mandrel 25, in the completed convolute tube 1, the leading edge 7 of the second sheet 5 is positioned ahead of and adjacent to the trailing edge 4 of the first sheet 6.

The trailing edge 8 of the second sheet 5 (i.e., the trailing edge 48 of the composite sheet 60) defines an outer seam of the convolute tube 1 and is secured to and on the underlying winding 74 of the second sheet 5 by the adhesive coated on the upper surface 40 of the composite sheet 60. The trailing edge 8 of the second sheet 5 extends parallel to and along the entire length of the convolute tube 1. In general, the length of the convolute tube 1 refers to the expansion in parallel to the longitudinal center axis 9. The longitudinal center axis 9 preferably corresponds to the geometric center of the windings 2 of the first sheet 6. The convolute tube 1 may be of any length which can be accommodated on a specific winding mandrel 25.

The second sheet 5 serves to secure the trailing edge 4 of the first sheet 6 to and on an underlying winding 2 of the first sheet 6 to prevent it from springing away from the tube 1. The underwrap portion 70, and more particularly the portion of the second sheet 5 secured between the layers 14, 15 of the first sheet 6, prevents the second sheet 5 from loosening, thus maintaining a tightly wound tube 1 and resisting the unwinding of the tube 1. Preferably, the adhesive used to fix the second sheet 5 to the first sheet 6 at the lap seam 41 is the same as the adhesive 40 used to ensure that the first sheet 6 adheres to itself at the inner windings 2.

The achieved dimensions of the wound convolute tube 1 are related to the dimensions of the winding mandrel 25 and of first and second sheets 6, 5. Specifically, the inner diameter $ID_1$ of the convolute tube 1 is determined by the outer diameter of the winding mandrel 25 about which the composite sheet 60 is wound. More particularly, the inner diameter $ID_1$ of the convolute tube 1 is generally equal to the outer diameter of the winding mandrel 25.

The outer diameter $OD_1$ of the convolute tube 1 is generally an average diameter of the cross-section of the tube 1 as produced by the composite sheet 60 comprising the first and second sheets 6, 5. More particularly, the outer diameter $OD_1$ of the convolute tube 1 is a function of the outer diameter of the winding mandrel 25, the thickness $T_{20}$ and width $W_{24}$ of the first sheet 6, and the thickness $T_{21}$ and width $W_{23}$ of the second sheet 5. Specifically, when the composite sheet 60 is wrapped about the winding mandrel 25 of a set outer diameter, the number of turns of the composite sheet 60 around the winding mandrel 25 is determined by the width $W_{24}$ and thickness $T_{20}$ of the first sheet 6 and the width $W_{23}$ and thickness $T_{21}$ of the second sheet 5. Each wrap of either the first sheet 6 or the second sheet 5 around the winding mandrel 25 adds a layer of the thickness $T_{20}$ or $T_{21}$, and thus contributes toward the desired outer diameter $OD_1$ of the convolute tube 1 being formed. The resulting wound convolute tube 1 has a wall thickness Ti defined by the outer diameter $OD_1$ of the convolute tube 1 minus the inner diameter $ID_1$ of the convolute tube 1.

The width $W_{23}$ of the second sheet 5 is related to the dimensions of the convolute tube 1 by the following formula (2). More particularly, the width $W_{23}$ of the second sheet 5 satisfies the following formula (2):

$$W_{23} \geq W_{22} + (\pi * OD_6) + (R * 20 \text{ mm}) \tag{2},$$

where $R = T_{20}/T_{21}$, and where 20 mm is an equation constant, and $OD_6$ is a theoretical outer diameter of a convolute tube if formed only of the first sheet 6 without the second sheet 5. That is, the outer diameter $OD_6$ of formula (2) is the outer diameter of a convolute tube that would be formed using only the first sheet 6.

It will be understood by those skilled in the art that the width $W_{22}$ of the second segment 70 (i.e., the lap seam 41) and the width $W_{23}$ of the second sheet 5 are minimum calculated dimensions, and that one may utilize more material as desired to suit the specification of a particular end application.

Thus, according to the invention, the positioning of the second sheet 5 upon the first sheet 6 (i.e., the width $W_{22}$) of the overlap seam 41 is calculated by formula (1) (i.e., $W_{22} \geq R*8$ mm). Then, the necessary minimum overall width $W_{23}$ of the second sheet 5 is calculated by the summation of three dimensions using the ratio R. The first dimension is the width $W_{22}$ of the overlap seam 41 (i.e., the portion of the second sheet 5 that underwraps the first sheet 6 in the convolute tube 1). The second dimension is the approximate circumference that would have resulted from a convolutely wound tube of only the first sheet 1 of paper thickness $T_{20}$ about the mandrel 25 without the underwrap of the second sheet 5 (i.e., $\pi*OD_6$). The third dimension is the width of the portion of the second sheet 5 which continues to wrap upon itself from one complete wrap, and is equal to the ratio R multiplied by 20 mm.

In one embodiment, the first sheet 6 is formed of a paper material, and more preferably a paperboard (e.g., cardboard) material. A paperboard material has a grain, which is stronger in one direction than in the other, analogous to the grain in wood. The second sheet 5 is preferably formed of a paper material of the same material composition as that of the first sheet 6. In one embodiment, the convolute tube 1 is wound such that the grains of the paperboard material of the first sheet 6 are oriented parallel to the longitudinal center axis 9, while the fixation sheet is orientated for maximum flexibility. Preferably, the grains of the paper material of the second sheet 5 are oriented in the same direction and manner as that of the first sheet 6. Low crush strength and high beam strength can be thereby achieved.

As such, the convolute tube 1 is well suited for use as a paper tube in the packaging industry, and more particularly as a core for supporting pliable web materials such as carpets and the like. Preferably, the convolute tube 1 of the invention is a carrier tube for a sensor device, and more particularly a disposable sensor device, used in the molten metals processing industry. However, it will be understood by those skilled in the art that the convolute tube 1 of the invention may be used in any application that requires or would benefit from a wound tube. It will also be understood that the convolute tube 1 of the invention is not limited to a paper or paperboard tube The relatively small thickness of the second sheet 5 of the convolute tube 1 facilitates prevention of the unskived trailing edge 8 of the second sheet 5 from peeling up from the underlying winding layer of the composite sheet 60, without the need for abrasive processing such as skiving. The configuration of the convolute tube 1 also prevents the trailing edge 4 of the first sheet 6 from peeling up from the underlying winding of the first sheet 6. The peel up forces on the trailing edge 4 of the first sheet 6, which usually act at an approximately right angle relative to an adjacent underlying layer or overlying layer, are thus countered by the lateral shear forces of the second sheet 5 over a large surface area (i.e., the area of at least one convolution 74 and overwrap 72 of the second sheet).

As a result, no skiving is required and the convolute tube 1 can be produced in a highly environment friendly manner, with reduced fire and explosion hazard, less manufacturing equipment and overall reduced production expenditures. Moreover, the convolute tube 1 can be produce having a smooth exterior surface.

Figure 5:
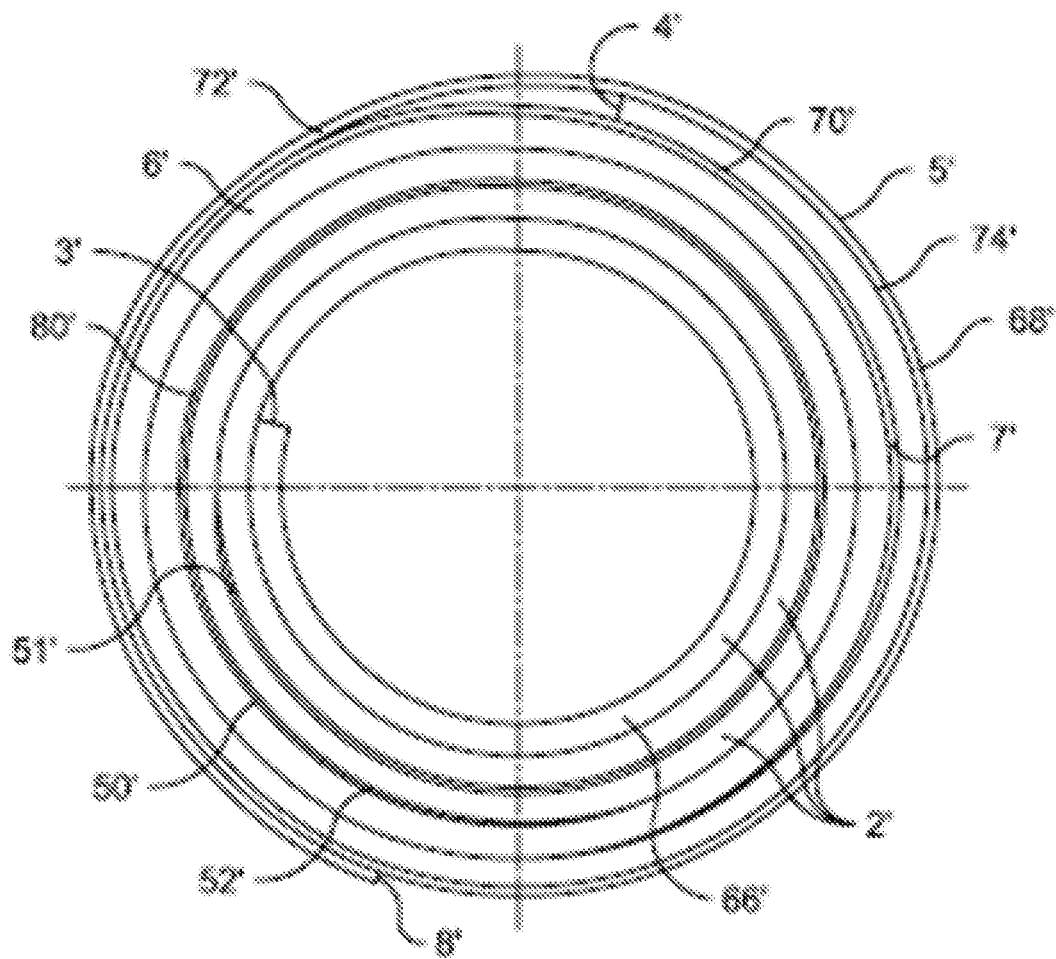
FIG. 5 is a top plan view of a convolute tube formed from a first paper sheet, a second sheet, and a third intermediate sheet of a moisture barrier material which have been wound together in accordance with one embodiment of the invention.

FIG. 5 shows a second embodiment of a convolute tube 1' formed from a different convolutely wound, adhesively secured composite sheet. With the exception of an intermediate layer 50, as described herein, the construction and configuration of the convolute tube 1' of FIG. 5 is the same as that of the convolute tube 1 of FIG. 1. The composite sheet utilized to form the convolute tube 1' includes a first sheet 6', a second sheet 5' and a third sheet 50'. The first sheet 6' has a first edge 3', which is a leading edge, and a second edge 4', which is a trailing edge. The second sheet 5' has a first edge 7', which is a leading edge, and a second edge 8', which is a trailing edge. Similar to the second sheet 5 of the composite sheet 60 of FIG. 4, a portion of the second sheet 5' overlaps with a portion of the first sheet 6', such that the leading edge 7' of the second sheet 5' overlaps the trailing edge 4' of the first sheet by a minimum calculated width. The overlapped portions of the first and second sheets 6', 5' are adhesively secured to each other.

Similar to the convolute tube 1, the convolute tube 1' of FIG. 5 includes a first segment 66' formed of a plurality of (preferably at least two) convolute windings 2' of the first sheet, an underwrap portion 70', and a third segment 68' formed of the second sheet 5' wrapped about and overlying the first sheet 6'. A width of the underwrap portion 70' satisfies formula (1) and a width of the second sheet 5' satisfies formula (2):

$$W_{22} \geq R*8 \text{ mm} \tag{1}$$

$$W_{23} \geq W_{22} + (\pi*OD_6) + (R*20 \text{ mm}) \tag{2},$$

wherein R is a ratio of a thickness of the first sheet 6' to a thickness of the second sheet 5', where 8 mm is an equation constant, where 20 mm is an equation constant, and wherein $OD_6$ is a theoretical outer diameter of a convolute tube if formed only of the first sheet 6' without the second sheet 5'.

However, different from the convolute tube 1 of FIG. 1, the convolute tube 1' of FIG. 5 further includes a fourth segment 80' formed of at least one convolute winding of the third sheet 50' secured to an underlying convolute winding 2' of the first sheet 6' and an overlying convolute winding 2' of the first sheet 6'. The third sheet 50' is an intermediate sheet layered upon and adhesively secured to a portion of the first sheet 6'. The intermediate sheet has a first edge 51', which is a leading edge, and a second edge 52', which is a trailing edge. In the completed convolute tube 1', the intermediate sheet 50' extends from its leading edge 51' for at least one convolution and then overlaps itself by at least 90 degrees to its final width at the trailing edge 52'. The intermediate sheet 50' preferably has a thickness which is less than the thickness of the second sheet 5'. More preferably, the thickness of the intermediate sheet 50' is equal to half of the thickness of the second sheet 5'. The trailing edge 52' of the intermediate sheet 50' is preferably spaced apart from the leading edge 7' of the second sheet 5'. As such, in the context of the composite sheet being wound by a winding mandrel 25 to form the convolute tube 1', the trailing edge 52' of the intermediate sheet 50' ends before the leading edge 7' of second sheet 5'.

The intermediate sheet 50' is made of a moisture resistant material, such as plastic or laminates, such as paper with a thin aluminum coating. In one embodiment, the intermediate sheet 50' is aluminum foil having a thickness in the range 0.05 to 0.2 mm, and more preferably a thickness of 0.1 mm. The intermediate sheet 50' serves as a moisture barrier layer in the convolute tube 1'. The remaining construction of the moisture barrier-containing convolute tube 1' of FIG. 5 is essentially identical to that of the convolute tube 1 of FIG. 1.

The invention will now be described with reference to the following Examples. The Examples are directed to convolute wound tubes of the invention to be used as carrier tubes to immerse sensors, such as thermocouples, into molten metals. However, it will be understood by those skilled in the art that the convolute tubes of the invention can be used in any application and in any industry which requires a convolute tube.

Example 1

A convolute tube 1 as shown in FIG. 1 is formed. The first sheet 6 has a thickness $T_{20}$ of 0.56 mm and a width $W_{24}$ of 715 mm. The first segment 66 formed by the first sheet 6 in the convolute tube 1 has an inner diameter $ID_1$ of 18.1 mm. A theoretical outer diameter $OD_6$ of a convolute tube which would be formed by only the first sheet 6 is 29.5 mm. The second sheet 5 has a thickness $T_{21}$ of 0.2 mm, resulting in a calculated ratio R of 2.8, a calculated minimum width of the underwrap portion 70 of 22.4 mm (i.e., 2.8*8 mm), a calculated distance of 92.6 mm (i.e., 29.5 mm*π) for one convolution of the second sheet 5, a calculated width of the overwrap portion 72 of 56 mm (i.e., 2.8*20 mm), and a total minimum width $W_{23}$ of the second sheet 5 of 171 mm. The overall minimum width $W_{64}$ of the composite sheet 60 is 863.6 mm.

Example 2

A convolute tube 1 as shown in FIG. 1 is formed. The first sheet 6 has a thickness $T_{20}$ of 0.6 mm and a width $W_{24}$ of 1305 mm. The first convolute segment 66 formed by the first sheet 6 in the convolute tube 1 has an inner diameter $ID_1$ of 18.1 mm. A theoretical outer diameter $OD_6$ of a convolute tube which would be formed by only the first sheet 6 is 36.8 mm. The second sheet 5 has a thickness $T_{21}$ of 0.2 mm, resulting in a calculated ratio R of 3.0, a calculated minimum width of the underwrap portion 70 of 24 mm (i.e., 3.0*8 mm), a calculated distance of 115.6 mm (i.e., 36.8 mm*π) for one convolution of the second sheet 5, a calculated width of the overwrap portion 72 of 60 mm (i.e., 3.0*20 mm), and a total minimum width $W_{23}$ of the second sheet 5 of 199.6 mm. The overall minimum width $W_{64}$ of the composite sheet 60 is 1480.7 mm.

Example 3

A convolute tube 1 as shown in FIG. 1 is formed. The first sheet 6 has a thickness $T_{20}$ of 1 mm and a width $W_{24}$ 1250 mm. The first convolute segment 66 formed by the first sheet 6 in the convolute tube 1 has an inner diameter $ID_1$ of 30 mm. A theoretical outer diameter $OD_6$ of a convolute tube which would be formed by only the first sheet 6 is 50 mm. The second sheet 5 has a thickness $T_{21}$ of 0.25 mm, resulting in a calculated ratio R of 4.0, a calculated minimum width of the underwrap portion 70 of 32 mm (i.e., 4.0*8 mm), a calculated distance of 157 mm (i.e., 50 mm*π) for one convolution of the second sheet 5, a calculated width of the overwrap portion 72 of 80 mm (i.e., 4.0*20 mm), and a total minimum width $W_{23}$ of the second sheet 5 of 269 mm. The overall minimum width $W_{64}$ of the composite sheet 60 is 1487 mm.

Example 4

A convolute tube 1' as shown in FIG. 5 is formed. The first sheet 6 has a thickness $T_{20}$ of 0.56 mm and a width $W_{24}$ of 715 mm. The first convolute segment 66' formed by the first sheet 6' in the convolute tube 1' has an inner diameter $ID_1$ of 18.1 mm. A theoretical outer diameter $OD_6$ of a convolute tube which would be formed by only the first sheet 6' is 29.5 mm. The second sheet 5' has a thickness $T_{21}$ of 0.2 mm, resulting in a calculated ratio R of 2.8, a calculated minimum width of the underwrap portion 70' of 22.4 mm (i.e., 2.8*8 mm), a calculated distance of 92.6 mm (i.e., 29.5 mm*π) for one convolution of the second sheet 5', a calculated width of the overwrap portion 72 of 56 mm (i.e., 2.8*20 mm), and a total minimum width $W_{23}$ of the second sheet 5' of 171 mm. The overall minimum width $W_{64}$ of the composite sheet is 863.6 mm.

The third (intermediate) sheet 50', applied to the upper surface of the first sheet 6', preferably has a thickness of 0.1 mm. The third sheet 50' is positioned at least after two layers 2' of the first sheet 6'. The minimum width of the third sheet satisfies the following formula (3):

$$\text{Minimum width of third sheet } 50' \geq 1.15*(((4*T_{20}) \, ID_1)*\pi) \quad (3),$$

where 1.15 is an equation constant, where 4 is an equation constant, where $T_{20}$ is the thickness of the first sheet 6' and where $ID_1$ is the inner diameter of the convolute tube 1' (equal to the outer diameter of the winding mandrel 25). In Example 4, the calculated minimum width of the third sheet 50' is 69.7 mm. Formula (3) provides for approximately 15% more material of the third sheet 50' beyond one full convolution of the third sheet 50'. However, it will be understood that more material may be used and can be determined by an adjustment of formula (3) to increase the equation constant "1.15". The third sheet 50' is ignored for purposes of calculating $OD_6$.

The third sheet 50' can also be placed after any number of convolutions of the first sheet 6', in which case the factor "$4*T_{20}$" would be incremented to accommodate the number of layers. For example, for a starting position after 3 layers of the first sheet 6', the width of the third sheet 50' would be calculated by the following formula: $1.15*(((6*T_{20})+ID_1)*\pi)$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

The invention claimed is:

1. A convolutely wound tube formed of a composite sheet including a first sheet and a second sheet, the convolutely wound tube comprising:
    a first segment formed of a plurality of convolute windings of the first sheet;
    a second segment formed of directly adhered and overlapping portions of the first sheet and the second sheet; and
    a third segment formed of the second sheet wrapped about and overlying the first sheet, the second segment being an underwrap portion positioned between a layer of the first sheet and a layer of the second sheet.

2. The convolutely wound tube of claim 1, wherein a width ($W_{22}$) of the second segment satisfies formula (1) and a width ($W_{23}$) of the second sheet satisfies formula (2):

$$W_{22} \geq R*8 \text{ mm} \quad (1)$$

$$W_{23} \geq W_{22} + (\pi*OD_6) + (R*20 \text{ mm}) \quad (2),$$

wherein R is a ratio of a thickness of the first sheet to a thickness of the second sheet, and
wherein $OD_6$ is a theoretical outer diameter of a convolute tube if formed only of the first sheet without the second sheet.

3. The convolutely wound tube of claim 2, wherein the thickness of the second sheet is smaller than the thickness of the first sheet.

4. The convolutely wound tube of claim 3, wherein the ratio R is between 2 and 5.

5. The convolutely wound tube of claim 1, wherein the third segment is formed of at least one convolute winding of the second sheet which overlies a layer of the first sheet and the second segment.

6. The convolutely wound tube of claim 5, wherein the third segment further comprises a portion of the second sheet overlying the at least one convolute winding of the second sheet.

7. The convolutely wound tube of claim 1, wherein the first sheet has a first edge defining an inner edge of the tube and an opposing second edge.

8. The convolutely wound tube of claim 1, wherein the second sheet has a first edge and an opposing second edge, the second edge of the second sheet defining an outer seam of the convolutely wound tube, the underwrap portion including the first edge of the second sheet and the third segment including the second edge of the second sheet.

9. The convolutely wound tube of claim 1, wherein the underwrap portion is an adhesively secured lap seam joining the first and second sheets.

10. The convolutely wound tube of claim 1, wherein the first sheet is formed of a paper material.

11. The convolutely wound tube of claim 1, wherein the second sheet is formed of a paper material.

12. A convolutely wound tube formed of a composite sheet including a first sheet, a second sheet and a third sheet, the convolutely wound tube comprising:
    a first segment formed of a plurality of convolute windings of the first sheet;
    a second segment formed of directly adhered and overlapping portions of the first sheet and the second sheet;
    a third segment formed of the second sheet wrapped about and overlying the first sheet, the second segment being an underwrap portion positioned between a layer of the first sheet and a layer of the second sheet; and
    a fourth segment formed of at least one convolute winding of the third sheet which is secured between an underlying convolute winding of the first sheet and an overlying convolute winding of the first sheet.

13. The convolutely wound tube of claim 12, wherein a width ($W_{22}$) of the second segment satisfies formula (1) and a width ($W_{23}$) of the second sheet satisfies formula (2):

$$W_{22} \geq R*8 \text{ mm} \quad (1)$$

$$W_{23} \geq W_{22} + (\pi*OD_6) + (R*20 \text{ mm}) \quad (2).$$

14. The convolutely wound tube of claim 13, wherein the ratio R is between 2 and 5.

15. The convolutely wound tube of claim 13, wherein a thickness of the third sheet is smaller than the thickness of the second sheet.

16. The convolutely wound tube of claim 12, wherein the first sheet is formed of a paperboard material.

17. The convolutely wound tube of claim 16, wherein the second sheet is formed of a paper material, the thickness of the second sheet being smaller than the thickness of the first sheet.

18. The convolutely wound tube of claim 12, wherein the third sheet is made of a moisture resistant material.

19. The convolutely wound tube of claim 12, wherein a reminder portion the third sheet overlaps the at least one convolute winding of the third sheet by a distance of at least 90° of the circumference of the at least one convolute winding of the third sheet.

* * * * *